United States Patent
Whitehouse

[11] Patent Number: 6,031,200
[45] Date of Patent: Feb. 29, 2000

[54] IN-PROCESS KERF MEASUREMENT SYSTEM

[75] Inventor: David R. Whitehouse, Weston, Mass.

[73] Assignee: Data Technology, Inc., Wilmington, Mass.

[21] Appl. No.: 09/128,099

[22] Filed: Aug. 3, 1998

Related U.S. Application Data

[60] Provisional application No. 60/054,526, Aug. 4, 1997.

[51] Int. Cl.$^7$ .................................................. B23K 26/00
[52] U.S. Cl. .............................. 219/121.67; 219/121.72; 219/121.83
[58] Field of Search ......................... 219/121.83, 121.68, 219/121.69, 121.67, 121.72, 121.84; 356/385, 386, 384; 700/166

[56] References Cited

U.S. PATENT DOCUMENTS

| | | | |
|---|---|---|---|
| 5,659,479 | 8/1997 | Duley et al. | 700/166 |
| 5,680,219 | 10/1997 | Rydningen . | |
| 5,691,540 | 11/1997 | Halle et al. . | |

FOREIGN PATENT DOCUMENTS

| | | | |
|---|---|---|---|
| 59-163091 | 9/1984 | Japan | 219/121.83 |
| 62-183991 | 8/1987 | Japan | 219/121.83 |
| 1-224190 | 9/1989 | Japan | 219/121.83 |
| 2-299787 | 12/1990 | Japan | 219/121.83 |
| 6-673 | 1/1994 | Japan . | |

*Primary Examiner*—Geoffrey S. Evans
*Attorney, Agent, or Firm*—William B. Ritchie

[57] ABSTRACT

A direct in-process measurement of the bottom kerf width uses a hardware, vision, and software system which captures a direct image of this kerf, computes its average width over a prescribed length and presents the data for visual observation, automatic control, and/or recordkeeping. In addition, by expanding the system to a measurement of the width of the top of the kerf, the verticality of the kerf may also be determined. In the preferred embodiment, a laser-cutting head produces controlled width kerfs in a sheet of plywood according to a preprogrammed pattern. A video camera is mounted relative to the cutting head and is held by a positioning system that is programmed to follow behind the cutting process and directly over the kerf. The optics of the camera are adjusted to view through the kerf and are focused on the bottom of the kerf which is backlit by a subsurface lighting system mounted in the corners of the tub on which the dieboard is mounted. The camera sends a video signal to a monitor that shows a reverse shadow of the bottom of the open kerf. This video signal is also monitored by a data acquisition and analysis system that is programmed to capture an image at some specific locations or times. These images are then analyzed for average width, root mean square (rms) variation, location, and orientation and the system parameters are adjusted accordingly to correct any deficiencies found in the kerf width.

20 Claims, 5 Drawing Sheets

IN-PROCESS KERF MEASUREMENT SYSTEM

This application claims the benefit of U.S. Provisional No. 60/054,526 filed Aug. 4, 1997.

FIELD OF THE INVENTION

This invention relates to the field of measurement systems for measuring the kerfs created by primary cutting processes and, in particular, to the field of in-process measurement of kerfs created in flat and rotary dieboards by laser cutting.

BACKGROUND OF THE INVENTION

In making cardboard boxes, a wooden die is prepared that is used to crease the cardboard so that it is folded accurately. A kerf is made in the plywood that serves to hold a steel rule that imprints the fold lines on the cardboard when the die is placed in a press. If the kerf is not accurately cut, the rule will not be held or will not be in the right position and the cardboard will not be creased properly. This problem is exacerbated by the fact the wooden dies are often very large.

The laser has long been used for cutting the knifing grooves in flat and rotary dieboards. For many years the technology was limited to the use of a 500 watt $CO_2$ lasers with fixed distances from the laser to the focusing lens to cut plywood into desired shapes for use as dieboards. The key processing parameters were the control of top and bottom kerf dimensions, kerf verticality or perpendicularity to the board surface, and kerf walls that remained within known tolerances of being straight.

From the nature of the laser cutting process, the dieboards were placed on an open faced enclosure or "tub" which would catch scrap material, collect the smoke and fumes for proper exhaust, and provide for laser safety by eliminating the exposure of the operators to laser radiation. As a consequence of this construction, the bottom of the dieboard is not accessible to the operator during the cutting process, and a "direct" measurement of the bottom kerf width is not possible. Operators have developed an indirect procedure for determining the correctness of this dimension by inserting a blade or "rule" into the kerf and "feeling" the resistance to insertion and withdrawal.

As technology has advanced to higher power lasers and moving optic systems, throughput has increased dramatically, and this increased productivity has called for more automatic systems. One obvious impediment to higher productivity is the inability to determine the bottom kerf width while cutting so that in-process adjustments can be made. While the top kerf width is readily controlled by focusing techniques, the bottom kerf width is dependent on a "burning" process which can be affected by a number of variables inherent in the plywood being cut, the laser, the motion system, the process environment and system programming.

In the current process, test cuts are made in the plywood in the X and Y directions and taper gauges are inserted to measure the top width of kerf. Based upon this measurement, an appropriately sized rule is inserted into the kerf to obtain a "feel" for tightness and an estimate of the bottom width. Laser and motion system parameters are consequently adjusted and additional test cuts are made until the estimated bottom widths are correct. Once actual cuts are made, the dimensions may or may not be periodically checked in a similar fashion over the entire board length depending upon its size, material, required accuracy, and operator sensitivity.

As is apparent from the above description, the current measuring process is imprecise and is performed after the material is fully cut, resulting in increased scrap. In addition, the offline measurement of the plywood and subsequent adjustment of the cutting process results in significant and costly machine down-time. Therefore, there is a need for a system for measuring the kerf of a laser cut plywood dieboard which provides accurate in-process measurement and adjustment of the system variables such that both scrap and machine down-time are reduced.

SUMMARY OF THE INVENTION

The apparatus and method of the present invention provide for a direct in-process measurement of the bottom kerf width by a novel hardware, vision, and software system which captures a direct image of this kerf, computes its average width over a prescribed length and presents the data for visual observation, automatic control, and/or record-keeping. In addition, by expanding the system to a measurement of the width of the top of the kerf, the verticality of the kerf may also be determined.

In the preferred embodiment of the invention, a laser-cutting head produces controlled width kerfs in a sheet of plywood according to a preprogrammed pattern. A video camera is mounted relative to the cutting head and is held by a positioning system that is programmed to follow behind the cutting process and directly over the kerf. The optics of the camera are adjusted to view through the kerf and are focused on the bottom of the kerf which is backlit by a subsurface lighting system mounted in the corners of the tub on which the dieboard is mounted. The camera sends a video signal to a monitor that shows a reverse shadow of the bottom of the open kerf. This video signal is also monitored by a data acquisition and analysis system that is programmed to capture an image at some specific locations or times. These images are then analyzed for average width, root mean square (rms) variation, location, and orientation and the system parameters are adjusted accordingly to correct any deficiencies found in the kerf width.

In one embodiment of the invention, the video images generated by the camera are analyzed as described in connection with the preferred embodiment, but the resulting data is subsequently sent to an expert system which manipulates the data and automatically adjusts the process parameters to improve the quality of the cut board.

In still another embodiment of the invention, the focus of the camera is periodically adjusted between the top and bottom of the kerf and the resulting images are analyzed to determine the verticality of the kerf.

Therefore, it is an aspect of the present invention to provide an apparatus and method for in-process kerf measurement of laser cuts which reduces the setup time required to determine the optimum process parameter.

It is a further aspect of the present invention to provide an apparatus and method for in-process kerf measurement of laser cuts which minimizes operator judgement.

It is a further aspect of the present invention to provide an apparatus and method for in-process kerf measurement of laser cuts which allows for automatic correction of process parameters for boards with variable properties and eliminates the potential for the production of scrap product.

It is a further aspect of the present invention to provide an apparatus and method for in-process kerf measurement of laser dieboard cuts which provides a simple inexpensive method for keeping records of kerf width data for each cut board.

It is a further aspect of the present invention to provide an apparatus and method for in-process kerf measurement of laser dieboard cuts which may be used as a monitor and setup aid for manufacturing shaped edges at the bottom of kerfs.

It is a further aspect of the present invention to provide an apparatus and method for in-process kerf measurement of laser dieboard cuts which provides for an alternative check on the alignment of the laser cutting optics.

It is a still further aspect of the present invention to provide an apparatus and method for in-process kerf measurement of laser dieboard cuts which increases the safety of the process by removing the operator from the vicinity of the laser cutting process.

These aspects of the invention are not meant to be exclusive and other features, aspects, and advantages of the present invention will become be readily apparent to those of ordinary skill in the art when read in conjunction with the follow description, appended claims and accompanying drawings.

DETAILED DESCRIPTION OF THE DRAWINGS

Figure 1:
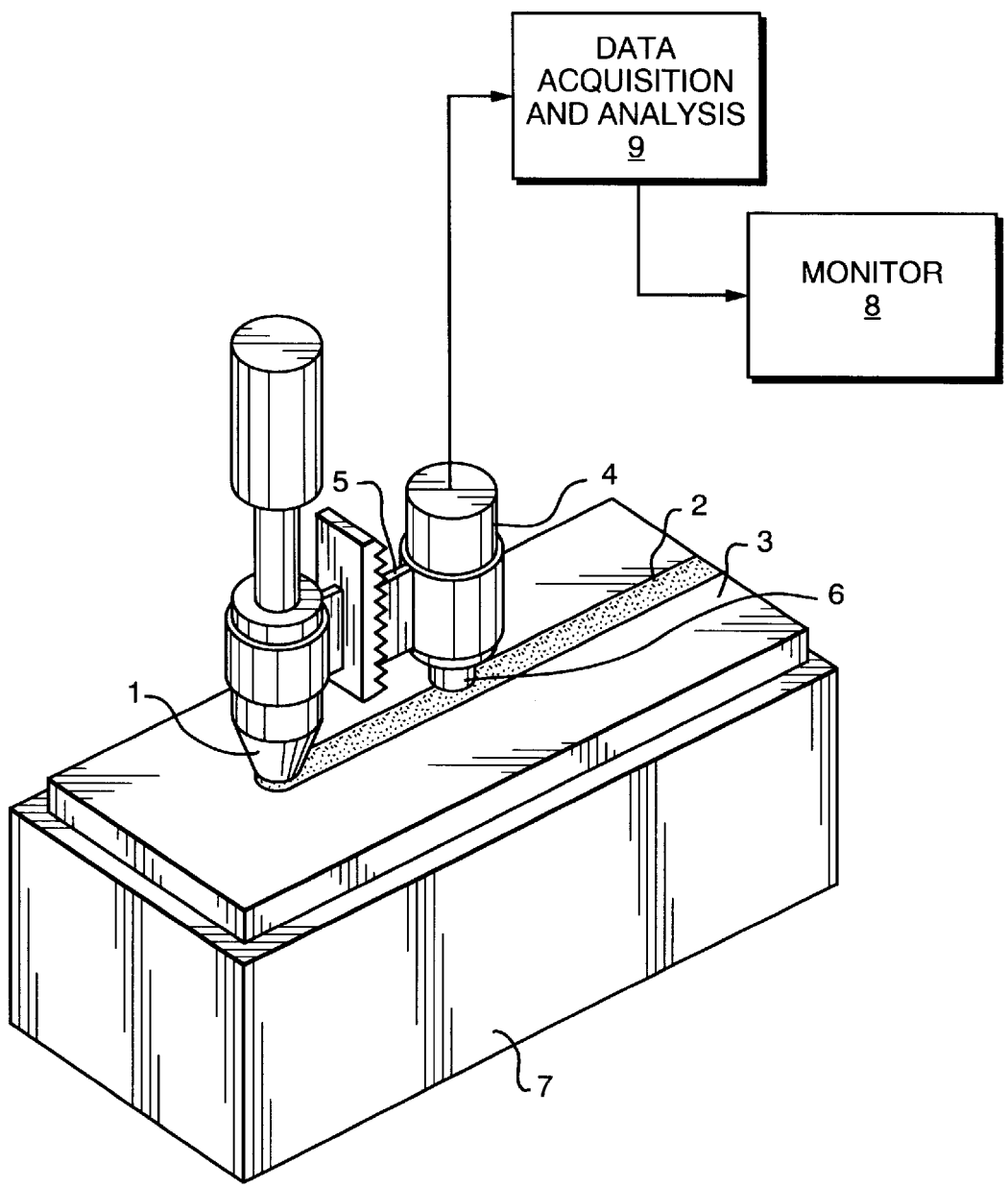
FIG. 1 is a diagrammatic view of the preferred embodiment of the present invention.

Referring first to FIG. 1, a diagrammatic representation of the preferred embodiment of the invention is shown. A laser-cutting head 1 produces a controlled width kerf 2 in a sheet of plywood 3 according to a preprogrammed pattern. A video camera 4 is mounted relative to the cutting head 1 and is held by a positioning system 5 that is programmed to follow behind the cutting process and directly over the kerf 2. The optics 6 of the camera 4 are adjusted to view through the kerf 2 and are focused on the bottom of the kerf 2 which is backlit by a subsurface lighting system (not shown) mounted in the corners of the tub 7 on which the plywood 3 is mounted. The camera 4 sends a video signal to a monitor 8 that shows a reverse shadow of the bottom of the open kerf 2. This video signal is also monitored by a data acquisition and analysis system 9 that is programmed to capture an image at some specific locations or times. These images are then analyzed for average width, root mean square (rms) variation, location, and orientation and the system parameters are adjusted accordingly to correct any deficiencies found in the kerf 2 width.

Figure 2:
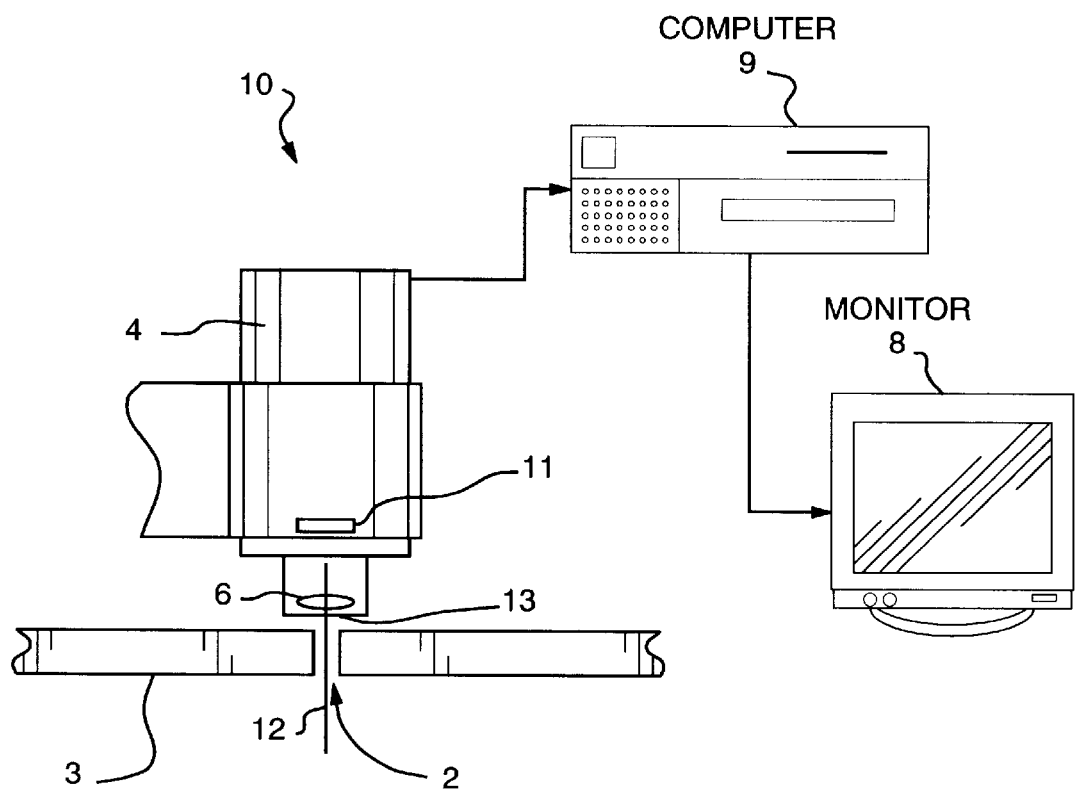
FIG. 2 is a diagrammatic view of the camera system of one embodiment of the present invention.

Referring now to FIG. 2, the camera system 10 utilized by the measuring system of the present invention is shown. In the preferred embodiment a miniature CCD camera 4(½ inch format) is positioned directly above the kerf 2. A standard or telecentric video lens 6 is mounted on the camera 6 and imaged on the bottom of the kerf 2 such that the magnification on the face 11 of the CCD 4 is approximately two. The telecentric lens 6 is preferred if the ultimate in measurement accuracy is required. The optical centerline 12 of the lens 6 and camera system 10 must be centered within the kerf, and the F/number of the iris 13 adjusted to give adequate illumination of the image on the face 11 of the CCD 4. The width of the iris 13 will determine the F/number and light collection power parallel to the kerf 2. The output of the camera is fed through the computer of the data acquisition system 9 and displayed on an output monitor 8.

Figure 3:
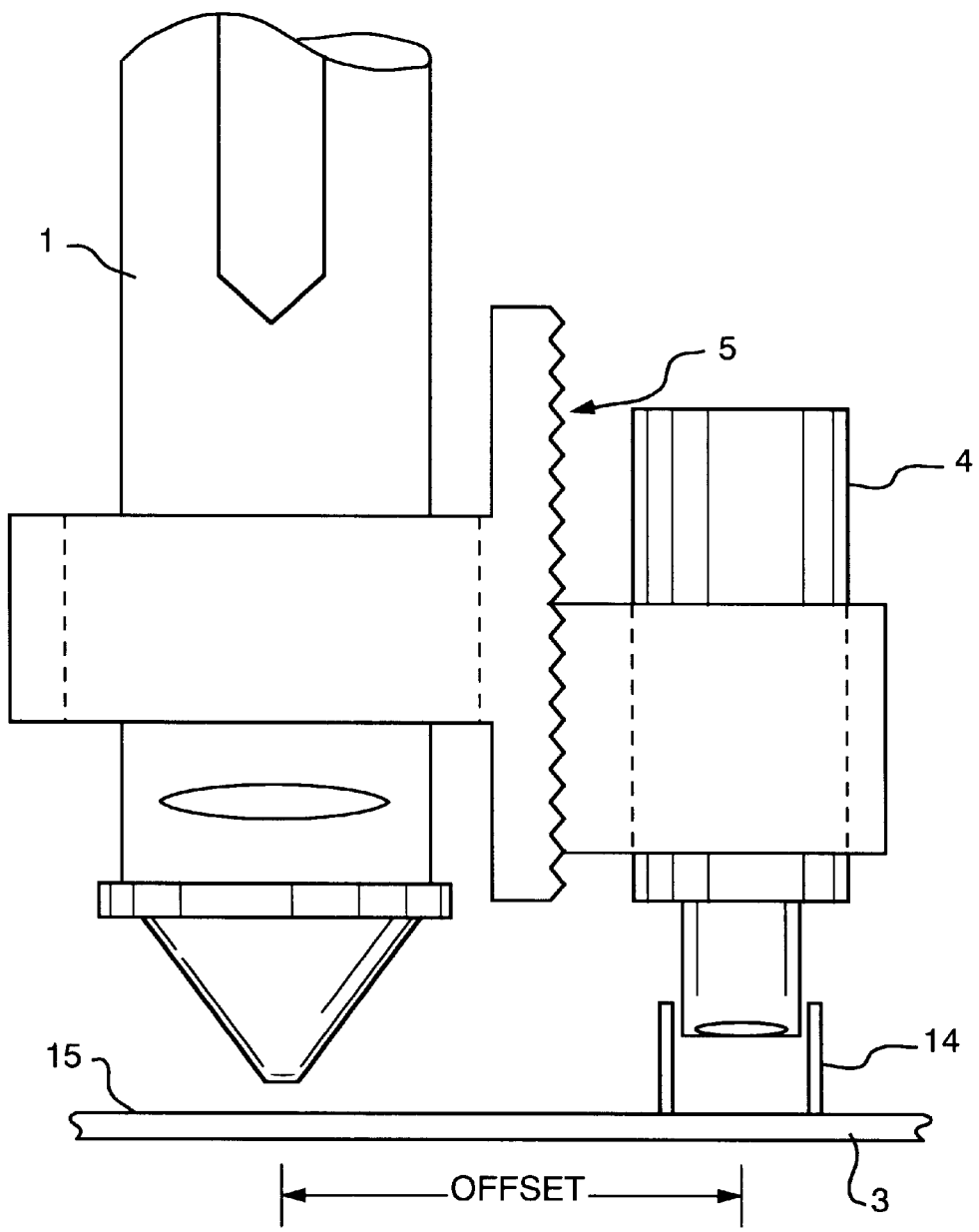
FIG. 3 is a diagrammatic view of the camera mounting system of one embodiment of the present invention.

Referring now to FIG. 3, the mechanical mounting system 5 for the camera 4 of FIG. 2 is shown. The camera 4 is held in precise position relative to the laser cutting head 1 with the camera axis being exactly parallel to the cutting head axis with the maximum fixed offset between the two axes. The camera axis can be rotated aximuthally around the cutting head in order to accommodate a given thickness of material that is being cut. The mechanical mount also contains a light shade 3 located between the camera lens 6 and the material to be cut which automatically adjusts to the top surface 15 of the material so that no background light enters the lens 6 from the top surface 15.

Figure 4:
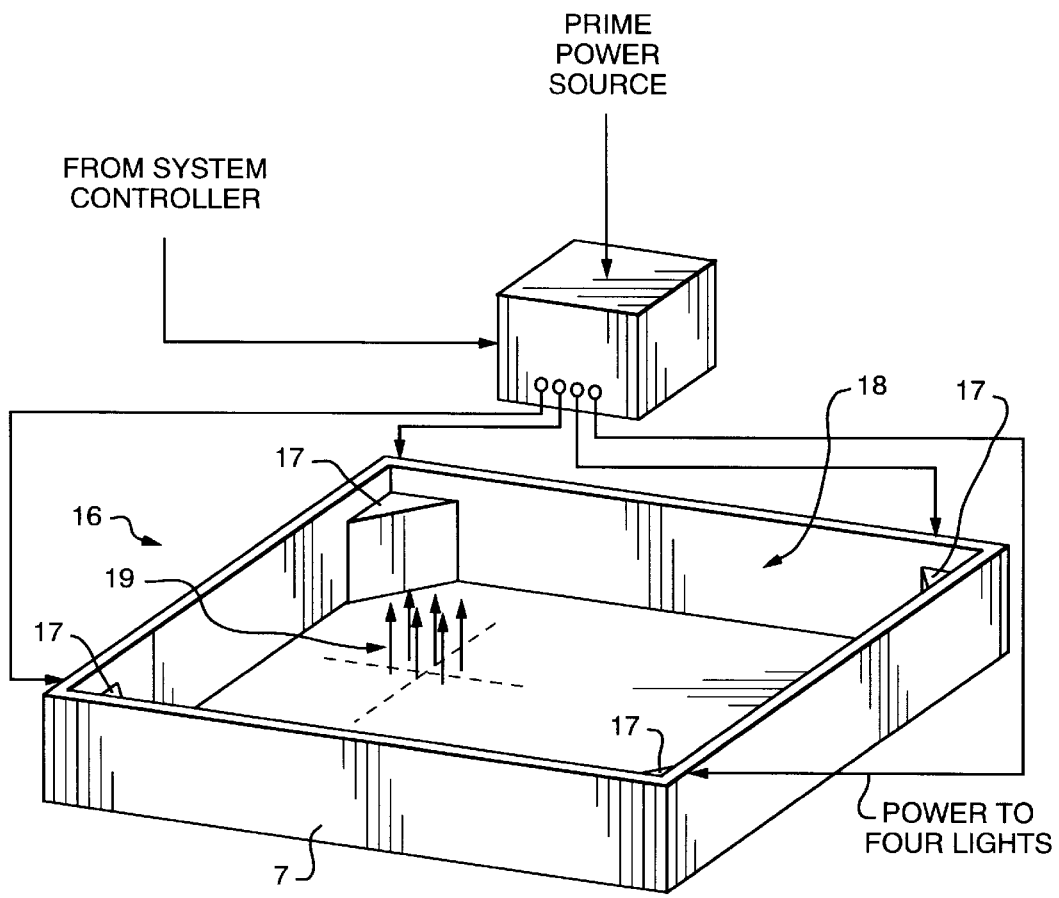
FIG. 4 is an isometric view of the subsurface lighting system of one embodiment of the present invention.

Referring now to FIG. 4, the subsurface lighting system 16 utilized by the measurement system of the present invention is shown. The subsurface lighting system 16 is mounted inside a cutting tub 7 which is an element of all laser cutting systems. The cutting tub 7 supports the material when it is being cut and provides an enclosed space to collect the fumes and cutting waste generated by the laser cutting operation. One light 17 is mounted in each of the four corners of the tub 7 with each being appropriately shielded from possible damage by the cutting action of the laser. Reflectors are positioned behind each light source such that the main energy is directed toward the volume of the tub 6. All internal surfaces 18 and supporting pins 19 in the tub 6 are optimized for scattering of the light radiation. The system controller can modulate each light so that the particular mode of measurement and cutting can be optimized.

Figure 5:
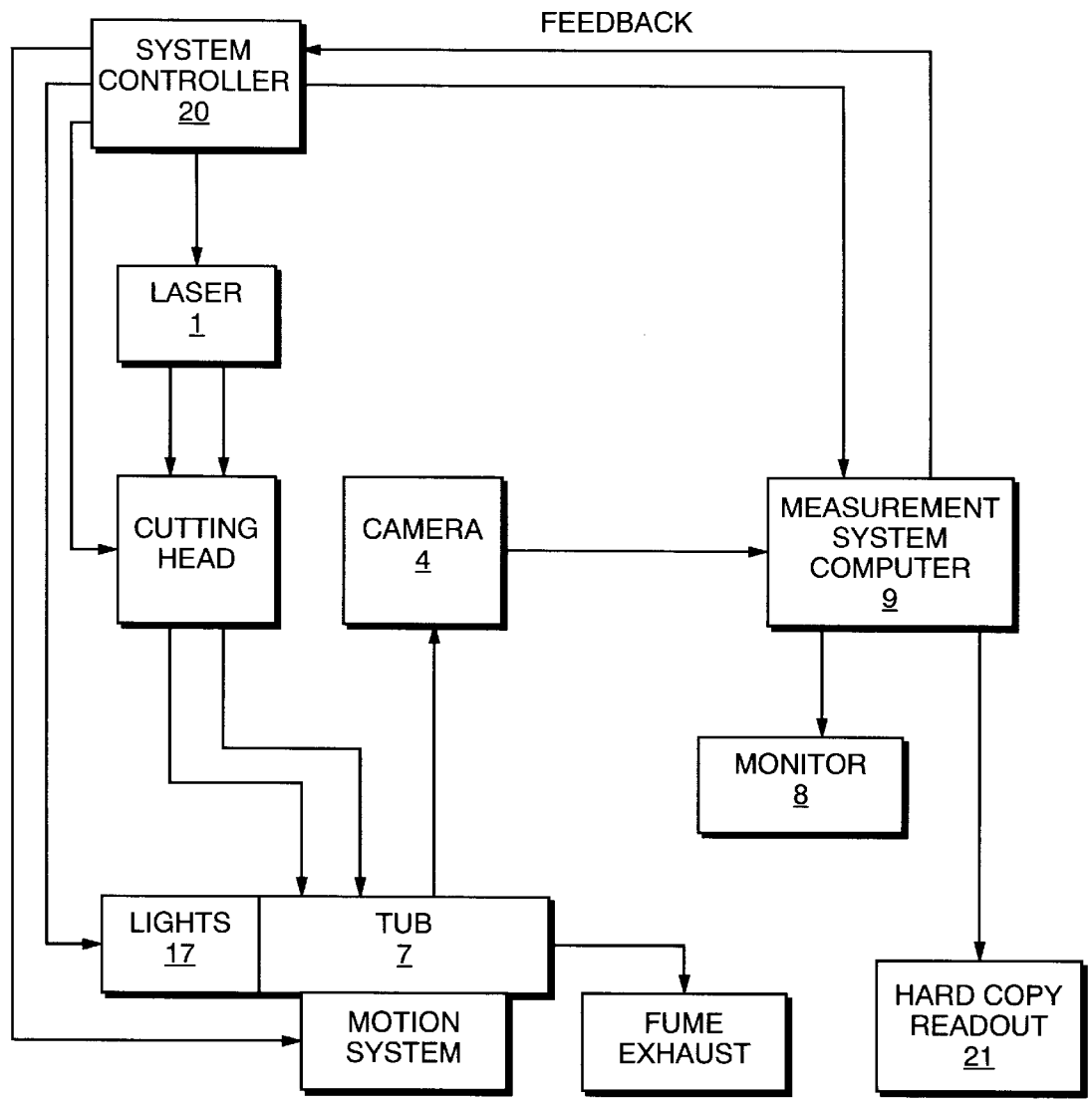
FIG. 5 is a block diagram of one embodiment of the present invention.

Referring now to FIG. 5 a block diagram of an embodiment of the present invention utilizing a system controller 20 is shown. In this embodiment, the measurement system computer 9 captures the images according to a preprogrammed pattern and analyzes the bottom kerf width, shape, fluctuations, verticality, etc. as the cutting process proceeds. Through an interface protocol, some or all of the information is fed back to the system controller 20 where it is analyzed by a resident "expert" program. If appropriate, the controller 20 will initiate automatic corrective action in laser power, cutting head height, and/or cutting speed. Some or all of the measurement information is also displayed on the monitor 8 for possible manual interruption by an operator. Lastly, the information is also recorded in memory and/or printed in hard copy for recordkeeping and quality inspection.

Although the present invention has been described in considerable detail with reference to certain preferred versions thereof, other versions would be readily apparent to those of ordinary skill in the art. For example, this measurement system may be used with other cutting systems such as water jet, EDM, plasma, etc., or on different materials such as metals or plastics to achieve similar results. Therefore, the spirit and scope of the appended claims should not be limited to the description of the preferred versions contained herein.

What is claimed is:

1. A camera system for capturing an image of a kerf cut through a sheet of material by a cutting head, said camera system comprising:

a video camera having a lens and an output device for sending an output signal; and a mechanical mounting system for attaching said video camera to the cutting head such that said video camera is maintained in a predetermined position such that a camera axis of said video camera is substantially parallel to a cutting axis of the cutting head and such that an optical centerline of said video camera is in substantial alignment with a centerline of said kerf, said mechanical mounting system comprising;
  a rotary joint dimensioned for rotatable attachment to the cutting head such that said optical centerline of said video camera may be rotated azimuthally around said cutting head to align said centerline with the centerline of the kerf;
  a Z-axis slide attached to said rotary joint for adjusting a height of said video camera relative to the cutting head such that said video camera is focused upon a predetermined position upon the kerf; and
  a camera mount fixedly joining said camera to said Z-axis slide such that said camera axis of said video camera is maintained in substantially parallel relation to the cutting head;
wherein the cutting head moves in a predetermined pattern to cut the kerf in the sheet of material and wherein the camera system captures an image of the predetermined position upon the kerf by rotating the camera axis about the cutting head such that the optical centerline of the video camera is aligned with the centerline of the kerf, adjusting the height of the video camera relative to the cutting head such that said lens of said video camera focuses upon the predetermined position upon the kerf, and capturing the image of the predetermined position upon the kerf with said video camera.

2. The camera system as claimed in claim 1 further comprising a computer for controlling said position of said video camera by controlling the rotation of said rotary joint and the height adjustment of said Z-axis slide.

3. The camera system as claimed in claim 1 further comprising a light shade disposed between said lens of said video camera and a top surface of the sheet of material for preventing entry of background light from said top surface through said lens.

4. The camera system as claimed in claim 3 wherein said light shade comprises a telescoping adjustment for automatically adjusting said light shade to said top surface of said sheet.

5. The camera system as claimed in claim 1 wherein said video camera is a CCD camera having an iris adjustment for adjusting a width of an iris and wherein said lens is a telecentric video lens.

6. A system for controlling a kerf cut through a sheet of material, said system comprising:
  a cutting head for controllably cutting the kerf through the sheet of material;
  a subsurface lighting system for illuminating the kerf;
  a camera system for capturing an image of the illuminated kerf, said camera system comprising:
    a video camera having a lens and an output device for sending an output signal; and
    a mechanical mounting system for attaching said video camera to said cutting head such that said video camera is maintained in a predetermined position such that a camera axis of said video camera is substantially parallel to a cutting axis of said cutting head and such that an optical centerline of said video camera is in substantial alignment with a centerline of the kerf; and
  a measuring system in communication with said video camera for accepting said output signal from said video camera, processing said output signal according to a predetermined pattern, and analyzing said processed output signal to measure at least one predetermined attribute of the kerf for control by said cutting head;
wherein said cutting head cuts the kerf in the sheet of material, said subsurface lighting system illuminates the kerf, said camera system captures an image of a predetermined point along the illuminated kerf and sends an output signal to said data acquisition and analysis system, and said measurement system measures at least one predetermined attribute of the kerf based upon said output signal such that said cutting head may be adjusted to control the kerf.

7. The system as claimed in claim 6 further comprising a monitor attached to said measurement system for displaying said measurement of said at least one attribute of said kerf.

8. The system as claimed in claim 6 wherein said at least one predetermined attribute of the kerf is chosen from a group consisting of a bottom kerf width, a top kerf width, a fluctuation in the width of the bottom kerf, a fluctuation in the width of the top kerf, a verticality of the kerf, and a fluctuation of the verticality of the kerf.

9. The system as claimed in claim 6 further comprising a control system for controlling said kerf, said control system comprising a data input for accepting said measurement from said measurement system, and a system controller for analyzing said measurement and controlling said cutting head based upon said analysis such that said kerf is controlled.

10. The system as claimed in claim 9 wherein said cutting head is a laser cutting head and wherein said system controller controls said cutting head by controlling at least one of a group of cutting head attributes consisting of laser power, cutting head height, and cutting speed.

11. The system as claimed in claim 6 further comprising a data storage device for storing said measurement of said at least one attribute of said kerf.

12. The system as claimed in claim 6 wherein said subsurface lighting system comprises a cutting tub having a plurality of corners, a plurality of lights for mounting in each of said plurality of corners, and a plurality of reflectors disposed behind each of said plurality of lights for directing a main light energy from said plurality of lights away from said corners of said cutting tub.

13. The system as claimed in claim 9 wherein said subsurface lighting system comprises a cutting tub having a plurality of corners, a plurality of lights for mounting in each of said plurality of corners, and a plurality of reflectors disposed behind each of said plurality of lights for directing a main light energy from said plurality of lights away from said corners of said cutting tub, and wherein said system controller modulates each of said plurality of lights to optimize said illumination for a predetermined mode of measurement.

14. The system as claimed in claim 13 wherein said cutting tub further comprises a plurality of supporting pins and wherein said supporting pins are optimized for scattering of light energy from said plurality of lights.

15. The system as claimed in claim 6 wherein said mechanical mounting system of said camera system comprises:
  a rotary joint dimensioned for rotatable attachment to said cutting head such that said optical centerline of said video camera may be rotated azimuthally around said cutting head to align said centerline with the centerline of the kerf;
  a Z-axis slide attached to said rotary joint for adjusting a height of said video camera relative to said cutting head such that said video camera is focused upon a predetermined position upon the kerf; and a camera mount fixedly joining said camera to said Z-axis slide such that said camera axis of said video camera is maintained in substantially parallel relation to said cutting head.

16. The system as claimed in claim 9 wherein said mechanical mounting system of said camera system comprises:

a rotary joint dimensioned for rotatable attachment to said cutting head such that said optical centerline of said video camera may be rotated azimuthally around said cutting head to align said centerline with the centerline of the kerf;

a Z-axis slide attached to said rotary joint for adjusting a height of said video camera relative to said cutting head such that said video camera is focused upon a predetermined position upon the kerf; and a camera mount fixedly joining said camera to said Z-axis slide such that said camera axis of said video camera is maintained in substantially parallel relation to said cutting head; and wherein said system controller controls said position of said video camera by controlling the rotation of said rotary joint and the height adjustment of said Z-axis slide.

17. A method of controlling a kerf cut through a sheet of material comprising the steps of:

setting at least one of a plurality of parameters of a cutting head;

energizing said cutting head;

cutting said sheet with said cutting head to form a kerf;

illuminating said kerf;

positioning a video camera at a predetermined position such that an optical centerline of said video camera is in substantial alignment with a centerline of the kerf;

capturing at least one image of at least one predetermined location upon said kerf;

processing said at least one captured image according to a predetermined pattern;

analyzing said image to measure at least one predetermined attribute of the kerf;

analyzing at least one of said predetermined attributes; and adjusting said parameters of said cutting head based upon said analysis of said at least one of said predetermined attributes such that said kerf is controlled.

18. The method as claimed in claim 17 further comprising the step of displaying said at least one predetermined attribute on a monitor.

19. The method as claimed in claim 17 further comprising the step of storing said at least one predetermined attribute in a data storage device.

20. The method as claimed in claim 17 wherein said cutting head is a laser cutting head and wherein said steps of setting and adjusting at least one of a plurality of parameters of said cutting head comprises setting and adjusting at least one of a group of parameters consisting of laser power, cutting head height, and cutting speed.

* * * * *